United States Patent
Matsuda et al.

(10) Patent No.: US 9,120,707 B2
(45) Date of Patent: Sep. 1, 2015

(54) CUBIC BORON NITRIDE SINTERED BODY AND CUBIC BORON NITRIDE SINTERED BODY TOOL

(75) Inventors: Yusuke Matsuda, Itami (JP); Katsumi Okamura, Itami (JP); Satoru Kukino, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 777 days.

(21) Appl. No.: 13/510,429

(22) PCT Filed: Oct. 18, 2011

(86) PCT No.: PCT/JP2011/073913
§ 371 (c)(1),
(2), (4) Date: May 17, 2012

(87) PCT Pub. No.: WO2012/053507
PCT Pub. Date: Apr. 26, 2012

(65) Prior Publication Data
US 2012/0230786 A1  Sep. 13, 2012

(30) Foreign Application Priority Data
Oct. 18, 2010 (JP) ................................ 2010-233299

(51) Int. Cl.
*C22C 26/00* (2006.01)
*C04B 35/5831* (2006.01)
(Continued)

(52) U.S. Cl.
CPC ......... *C04B 35/5831* (2013.01); *C04B 35/6262* (2013.01); *C04B 35/62685* (2013.01);
(Continued)

(58) Field of Classification Search
USPC .......................................................... 75/244
See application file for complete search history.

(56) References Cited

U.S. PATENT DOCUMENTS 4,666,466 A   5/1987  Wilson
6,316,094 B1  11/2001 Fukaya et al.
(Continued)

FOREIGN PATENT DOCUMENTS

CN   1242350 A   1/2000
CN   1485299 A   3/2004
(Continued)

OTHER PUBLICATIONS

T. Taniguchi et al., "Growth of Cubic Boron Nitride Single Crystal under High Pressure using Temperature Gradient Method," The Review of High Pressure Science and Technology, vol. 7, 1998, pp. 980-982.

(Continued)

*Primary Examiner* — George Wyszomierski
*Assistant Examiner* — Ngoclan T Mai
(74) *Attorney, Agent, or Firm* — Venable LLP; Michael A. Sartori

(57) ABSTRACT cBN sintered body includes cBN and a binder phase, wherein a content of the cBN is 82-98 volume %, and in a cross section of the cBN sintered body, an isolated binder phase having an area of 0.05-0.5 $\mu m^2$ has a protrusion of two or more steps, and assuming that in a first-step protrusion, A1 represents a side length which is perpendicular in a tip direction, and B1 represents a side length which is parallel in the tip direction; and in a second-step protrusion, A2 represents a side length which is perpendicular in the tip direction, and B2 represents a side length which is parallel in the tip direction, an area ratio of an isolated binder phase having a protrusion in which A1/B1 is 1-10 times of A2/B2, to the whole of the binder phase having the area of 0.05-0.5 $\mu m^2$, is 25% or more.

7 Claims, 1 Drawing Sheet

(a)

(b)

(51) Int. Cl.
*C04B 35/626* (2006.01)
*C04B 35/645* (2006.01)

(52) U.S. Cl.
CPC ............... *C04B35/645* (2013.01); *C22C 26/00* (2013.01); *B23B 2226/125* (2013.01); *C04B 2235/3804* (2013.01); *C04B 2235/3847* (2013.01); *C04B 2235/3886* (2013.01); *C04B 2235/402* (2013.01); *C04B 2235/404* (2013.01); *C04B 2235/405* (2013.01); *C04B 2235/5436* (2013.01); *C04B 2235/5445* (2013.01); *C04B 2235/786* (2013.01); *C04B 2235/96* (2013.01); *Y10T 407/27* (2015.01)

(56) References Cited

U.S. PATENT DOCUMENTS

| | | |
|---|---|---|
| 2004/0002418 A1 | 1/2004 | Scurlock et al. |
| 2005/0143252 A1 | 6/2005 | Okamura et al. |
| 2008/0264203 A1 | 10/2008 | Dahl et al. |
| 2009/0181238 A1 | 7/2009 | Can et al. |
| 2009/0293370 A1 | 12/2009 | Goudemond et al. |
| 2010/0064594 A1 | 3/2010 | Pakalapati et al. |
| 2010/0099548 A1 | 4/2010 | Okamura et al. |
| 2010/0132266 A1 | 6/2010 | Twersky et al. |
| 2010/0313489 A1 | 12/2010 | Teramoto et al. |
| 2012/0042576 A1 | 2/2012 | Can et al. |
| 2012/0055099 A1* | 3/2012 | Bao et al. ................. 51/309 |

FOREIGN PATENT DOCUMENTS

| | | |
|---|---|---|
| CN | 1636935 A | 7/2005 |
| CN | 101084170 A | 12/2007 |
| CN | 101583451 A | 11/2009 |
| JP | 2002-302732 A | 10/2002 |
| JP | 2006-315898 | 11/2006 |
| JP | 2008-094670 | 4/2008 |
| JP | 2008-208027 | 9/2008 |
| JP | 2010-089223 | 4/2010 |
| WO | WO-2008/093577 A1 | 8/2008 |

OTHER PUBLICATIONS

V. L. Solozhenko, "New concept of BN phase diagram: an applied aspect," Diamond and Related Materials, Elsevier Science Publishers, Amsterdam, NL, vol. 4, No. 1, 1994, pp. 1-4.

Extended European Search Report in European Patent Application No. 11834346.6, dated Aug. 25, 2014.

Office Action in Chinese Patent Application No. 201180005244.3, dated Nov. 26, 2013.

Notice of Grounds of Rejection in Japanese Patent Application No. 2012-502361, dated Dec. 26, 2013.

* cited by examiner

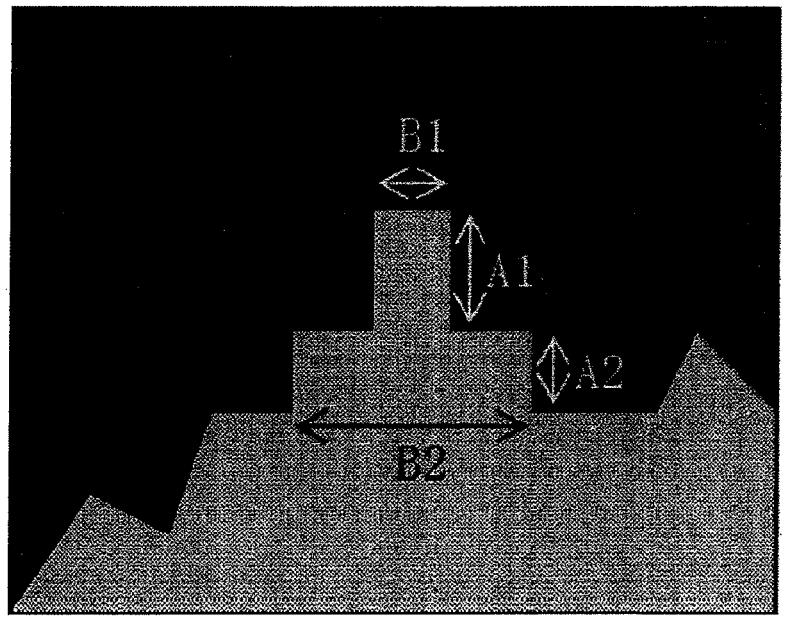
(a)
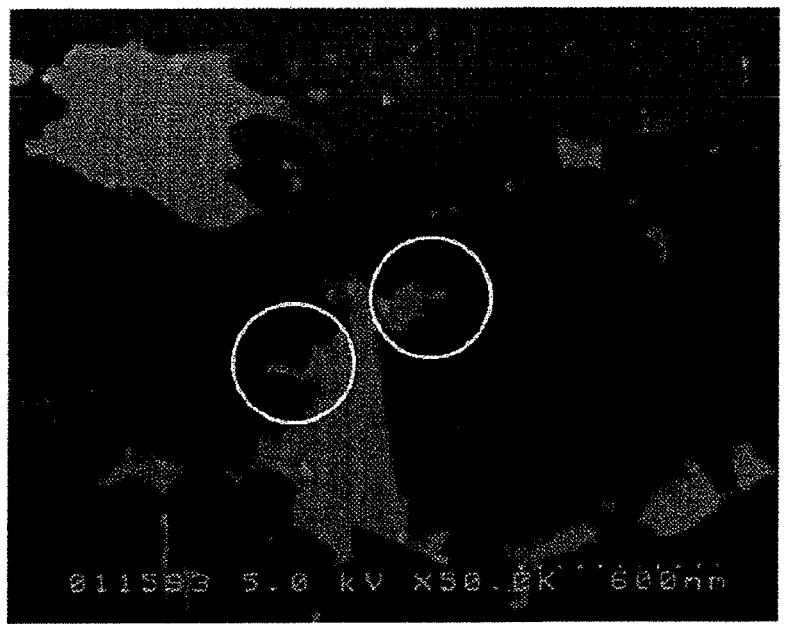
(b)

CUBIC BORON NITRIDE SINTERED BODY AND CUBIC BORON NITRIDE SINTERED BODY TOOL

TECHNICAL FIELD

The present invention relates to a cubic boron nitride (cBN) sintered body mainly composed of cBN.

BACKGROUND ART cBN is a high-hardness substance after diamond, and a cBN sintered body is used in various cutting tools, wear-resistant components, impact-resistant components and the like. A sintered body having a high content of cBN is generally used particularly for cutting of a cast iron/sintered alloy, and depending on processing conditions, the particle size of a cBN particle and the composition of a binder phase are optimized. Generally, if the content is fixed, toughness is enhanced as the cBN particles included in the sintered body become coarser. On the other hand, strength decreases because the binder phase becomes thicker. The relationship between the thickness of the binder phase and the strength is described in PTL 1. PTL 2 describes an example in which defects and microscopic cracks are eliminated in order to enhance chipping resistance and wear resistance of cBN particles themselves.

CITATION LIST

Patent Literature

PTL 1: Japanese Patent Laying-Open No. 2008-208027
PTL 2: Japanese Patent Laying-Open No. 2008-094670

SUMMARY OF INVENTION

Technical Problem

Under a rough processing condition, a high load is continuously applied to a tool, and thus, a certain level of toughness or higher toughness is required. If coarse-grained cBN is used in order to enhance toughness, chipping resistance decreases and the tool cannot withstand an impact during intermittent cutting.

A conventional way of thinking has been changed to solve the above problems. An object of the present invention is to obtain a cubic boron nitride sintered body having a high content of cubic boron nitride, in which toughness and strength can be increased at the same time and excellent chipping resistance and wear resistance are achieved even when coarse-grained cBN is used. Furthermore, an object of the present invention is to provide a cubic boron nitride sintered body tool suitable for continuous cutting and intermittent cutting under a rough processing condition of a cast iron/sintered alloy.

Solution to Problem

In order to solve the above problems, the inventors of the present invention have earnestly studied enhancement of uniformity of a binder phase and sintering conditions. As a result, the inventors of the present invention have found that an interface between cBN particles and a binder phase can be configured to have a wedge-shaped protrusion of two or more steps, which is highly effective at suppressing dropping, and with the above structure, toughness and strength can be increased at the same time even when coarse-grained cBN is used, and the present invention has been completed. The present invention has the following features.

(1) A cubic boron nitride sintered body including cubic boron nitride and a binder phase, wherein
  a content of the cubic boron nitride is 82 volume % or more and 98 volume % or less,
  in a cross section of the cubic boron nitride sintered body, an isolated binder phase having an area of 0.05 $\mu m^2$ or more and 0.5 $\mu m^2$ or less has a protrusion of two or more steps with respect to the cubic boron nitride, and
  assuming that in a first-step protrusion from a tip of the protrusion, A1 represents a side length which is perpendicular in a tip direction, and B1 represents a side length which is parallel in the tip direction; and in a second-step protrusion from the tip, A2 represents a side length which is perpendicular in the tip direction, and B2 represents a side length which is parallel in the tip direction, an area ratio of an isolated binder phase having a protrusion in which A1/B1 is one time or more and ten times or less of A2/B2, to the whole of the isolated binder phase having the area of 0.05 $\mu m^2$ or more and 0.5 $\mu m^2$ or less, is 25% or more.

(2) The cubic boron nitride sintered body according to (1) above, wherein the binder phase includes W, Co, Al, and any one or more of a simple substance, a mutual solid solution, carbide, nitride, carbonitride, boride, and oxide of at least one element selected from the group consisting of Zr, Ni, Cr, and Mo.

(3) The cubic boron nitride sintered body according to (1) or (2) above, wherein particles of the cubic boron nitride having a particle size of 1.5 $\mu m$ or more and 10 $\mu m$ or less after sintering constitute 50 volume % or more of the whole of the cubic boron nitride.

(4) The cubic boron nitride sintered body according to any one of (1) to (3) above, wherein the area ratio of the isolated binder phase having the protrusion in which A1/B1 is one time or more and ten times or less of A2/B2, to the whole of the binder phase having the area of 0.05 $\mu m^2$ or more and 0.5 $\mu m^2$ or less, is 40% or more.

(5) The cubic boron nitride sintered body according to any one of (1) to (4) above, wherein in the cross section of the cubic boron nitride sintered body, an area ratio of an isolated binder phase having an area exceeding 0.5 $\mu m^2$, to the whole of the binder phase, is 20% or less.

(6) The cubic boron nitride sintered body according to any one of (1) to (5) above, wherein the content of the cubic boron nitride is 86 volume % or more and 95 volume % or less.

(7) A cubic boron nitride sintered body tool, having the cubic boron nitride sintered body as recited in any one of (1) to (6) above, at least at a portion that forms a cutting edge.

Advantageous Effects of Invention

According to the present invention, the above problems are solved and there can be obtained a cubic boron nitride sintered body having a high content of cubic boron nitride, in which excellent chipping resistance and wear resistance are achieved. In addition, by using the cubic boron nitride sintered body according to the present invention, there can be provided a cubic boron nitride sintered body tool suitable for continuous cutting and intermittent cutting under a rough processing condition of a cast iron/sintered alloy.

BRIEF DESCRIPTION OF DRAWINGS

FIG. 1(a) is a schematic view of a shape of an interface between a binder phase and cBN that is focused on in the present invention.

FIG. 1(b) is an example of a structure of a sintered body within the scope of the present invention and shows a result of observation of a sample 1 by a scanning electron microscope in Example.

DESCRIPTION OF EMBODIMENTS

The present invention is directed to a cubic boron nitride sintered body including cubic boron nitride and a binder phase, wherein a content of the cubic boron nitride is 82 volume % or more and 98 volume % or less, and in a cross section of the cubic boron nitride sintered body, an isolated binder phase having an area of 0.05 $\mu m^2$ or more and 0.5 $\mu m^2$ or less has a protrusion of two or more steps with respect to the cubic boron nitride, and assuming that in a first-step protrusion from a tip of the protrusion, A1 represents a side length which is perpendicular in a tip direction, and B1 represents a side length which is parallel in the tip direction; and in a second-step protrusion, A2 represents a side length which is perpendicular in the tip direction, and B2 represents a side length which is parallel in the tip direction, an area ratio of an isolated binder phase having a protrusion in which A1/B1 is one time or more and ten times or less of A2/B2, to the whole of the isolated binder phase having the area of 0.05 $\mu m^2$ or more and 0.5 $\mu m^2$ or less, is 25% or more.

As mentioned above, in the cubic boron nitride sintered body according to the present invention, the content of the cubic boron nitride is 82 volume % or more and 98 volume % or less. The reason for this is as follows: as the content of the cBN becomes higher, an average of the area of the isolated binder phases becomes smaller and the binder phase is unlikely to serve as a starting point of dropping. On the other hand, if the content of the cBN becomes too high, catalysis of the binder phase is insufficient at the time of sintering, and thus, sintering is impossible. Therefore, the content of the cubic boron nitride is more preferably 86 volume % or more and 95 volume % or less.

In addition, as shown in FIG. 1(a), in the cross section of the cubic boron nitride sintered body, the isolated binder phase having the area of 0.05 $\mu m^2$ or more and 0.5 $\mu m^2$ or less has the protrusion of two or more steps with respect to the cubic boron nitride. As a result, an interface between the cubic boron nitride and the binder phase has a wedge shape and the effect of suppressing dropping of the cubic boron nitride is produced.

Furthermore, assuming that in the first-step protrusion from the tip of the protrusion, A1 represents the side length which is perpendicular in the tip direction, and B1 represents the side length which is parallel in the tip direction; and in the second-step protrusion, A2 represents the side length which is perpendicular in the tip direction, and B2 represents the side length which is parallel in the tip direction, the area ratio of the isolated binder phase having the protrusion in which A1/B1 is one time or more and ten times or less of A2/B2, to the whole of the isolated binder phase having the area of 0.05 $\mu m^2$ or more and 0.5 $\mu m^2$ or less, is 25% or more.

As a result, the effect of suppressing dropping of the cubic boron nitride particles due to the wedge of the binder phase is further strengthened. More preferably, the area ratio of the isolated binder phase having the protrusion in which A1/B1 is one time or more and ten times or less of A2/B2, to the whole of the isolated binder phase having the area of 0.05 $\mu m^2$ or more and 0.5 $\mu m^2$ or less, is 40% or more. Further preferably, the area ratio of the binder phase region is 50% or more.

In order to obtain catalysis assisting crystal growth of the cBN, the binder phase preferably includes W, Co, Al, and any one or more of a simple substance, a mutual solid solution, carbide, nitride, carbonitride, boride, and oxide of at least one element selected from the group consisting of Zr, Ni, Cr, and Mo.

Desirably, the particles of the cubic boron nitride having a particle size of 1.5 $\mu m$ or more and 10 $\mu m$ or less after sintering constitute 50 volume % or more of the whole of the cubic boron nitride. This is for maintaining high toughness in cutting under the rough processing condition.

Desirably, in the cross section of the cubic boron nitride sintered body, the area ratio of the isolated binder phase having the area exceeding 0.5 $\mu m^2$, to the whole of the binder phase, is 20% or less. This is for reducing the large-area binder phases that serve as a starting point of dropping.

In the present invention, as a result of earnest study of enhancement of uniformity of the binder phase and sintering conditions, the protrusion of two or more steps serving as the wedge is successfully formed at the interface between the binder phase and the cBN.

In a conventional manufacturing method, raw material powders constituting the binder phase have been blended at a certain mass ratio, and thereafter, the raw material powders have been subjected to heat treatment and mixed by using a ball mill including a pot made of cemented carbide and a ball of φ3.5 mm made of cemented carbide. On the other hand, in the present invention, in order to increase uniformity during heat treatment, mixing by means of the above-mentioned ball mill is performed before heat treatment, and after heat treatment, pulverization and mixing are performed by using an apparatus having a high pulverizing capability and including a pot made of zirconia and a ball of φ0.3 mm made of silicon nitride.

Conventionally, sintering has been performed in a pressure-temperature region where cBN is stable, in order to cause the binder phase to react with the cBN. In addition, PTL 2 discloses an example of crystal growth of cBN abrasive grains themselves. However, particularly in a cBN sintered body having a high cBN content of 82 volume % or more, it has been difficult to control crystal growth of the fine cBN abrasive grains such that the protrusion of two or more steps serving as "wedge" as described in the present invention is generated. Earnest study by the inventors of the present invention has allowed obtainment of the cBN sintered body having the protrusion of two or more steps serving as "wedge", by growing the cBN crystal through a pressure-temperature region where hBN appears in a stable manner, and thereafter, raising the pressure and the temperature of the cBN once to the pressure-temperature region where the cBN is stable, and then, sintering the cBN in a region where the cBN grows at a low speed.

At this time, it is preferable to set the sintering pressure range to 6.5 to 7.5 GPa and to set the maximum temperature during sintering to 1700 to 1900° C.

A cBN sintered body tool according to the present invention includes a cBN sintered body tool having the cBN sintered body according to the present invention at least at a portion of a base material such as cemented carbide or cermet that forms a cutting edge, or a cBN sintered body tool formed only by the cBN sintered body. These can be fabricated in accordance with a known method. The cBN sintered body may have a hard ceramics coating layer on a surface thereof.

Specifically, the cBN sintered body tool includes a cutting tool and the like.

EXAMPLE

Examples and Comparative Examples

<<Fabrication of Sintered Body>>
(Samples 1 to 4)
WC powders, Co powders, Al powders, and one selected from Zr, Ni, Cr, and Mo as shown in Table 1 were blended at a mass ratio of 60:25:10:5, and then, were mixed by using a ball mill including a pot and a ball of φ3.5 mm made of cemented carbide. Thereafter, the mixed powders were kept at 1000° C. in a vacuum for 30 minutes and were subjected to heat treatment. Thereafter, the mixed powders that had subjected to heat treatment were pulverized by using an apparatus having a high pulverizing capability and including a pot made of zirconia and a ball of φ0.3 mm made of silicon nitride. Thus, binder powders were obtained.

Next, these binder powders and cubic boron nitride powders having a particle size of 0.5 μm or more and 3.0 μm or less were uniformly mixed by using the above-mentioned ball mill at such a blend ratio that cubic boron nitride was 90 volume %. Thereafter, the mixed powders were kept at 1000° C. in a vacuum furnace for 20 minutes and were degassed.

Furthermore, the degassed mixed powders were charged into a capsule made of Mo. Thereafter, the mixed powders were pressurized to 7.0 GPa by using an ultrahigh-pressure apparatus, and then, the temperature was raised to 1300° C. and the mixed powders were kept under this pressure-temperature condition for 10 minutes. Subsequently, by using the above apparatus, the temperature was raised to 1800° C. while keeping the pressure, and the mixed powders were kept for about 5 minutes. Thereafter, the mixed powders were sintered at 1500° C. for 20 minutes. Thus, a cubic boron nitride sintered body including the cubic boron nitride and a binder phase was manufactured.

(Samples 5 to 9)

WC powders, Co powders, Al powders, and Zr powders were blended at a mass ratio of 60:25:10:5, and then, binder powders were produced by using a method similar to the method for manufacturing Samples 1 to 4.

Next, these binder powders and cubic boron nitride powders having a particle size of 0.5 μm or more and 3.0 μm or less were uniformly mixed by using the above-mentioned ball mill at such a blend ratio that cubic boron nitride was 98, 95, 85, 82, or 78 volume % as shown in Table 1. Thus, a cubic boron nitride sintered body was manufactured by using a method similar to the method for manufacturing Samples 1 to 4.

(Sample 10)

WC powders, Co powders and Al powders were blended at a mass ratio of 60:25:15, and then, binder powders were produced by using the method similar to the method for manufacturing Samples 1 to 4.

Next, these binder powders and cubic boron nitride powders having a particle size of 0.5 μm or more and 3.0 μm or less were uniformly mixed by using the above-mentioned ball mill at such a blend ratio that cubic boron nitride was 90 volume %. Thus, a cubic boron nitride sintered body was manufactured by using the method similar to the method for manufacturing Samples 1 to 4.

(Samples 11 and 12)

As shown in Table 1, TiN powders or $Al_2B_3$ powders and cubic boron nitride powders having a particle size of 0.5 μm or more and 3.0 μm or less were uniformly mixed by using the above-mentioned ball mill at such a blend ratio that cubic boron nitride was 90 volume %. Thus, a cubic boron nitride sintered body was manufactured by using the method similar to the method for manufacturing Samples 1 to 4.

(Sample 13)

WC powders, Co powders, Al powders, and Zr powders were blended at a mass ratio of 60:25:10:5, and then, binder powders were produced by using the method similar to the method for manufacturing Samples 1 to 4.

Next, as shown in Table 1, these binder powders and cubic boron nitride powders having a particle size of 0.5 μm or more and 3.0 μm or less were uniformly mixed by using the above-mentioned ball mill at such a blend ratio that cubic boron nitride was 90 volume %. A cubic boron nitride sintered body was manufactured by using the method similar to the method for manufacturing Samples 1 to 4, except that the sintering pressure and the sintering temperature were set as shown in Table 1.

(Sample 14)

WC powders, Co powders, Al powders, and Zr powders were blended at a mass ratio of 60:25:10:5, and then, binder powders were produced by using the method similar to the method for manufacturing Samples 1 to 4.

Next, these binder powders and cubic boron nitride powders having a particle size of 0.1 μm or more and 1.0 μm or less were uniformly mixed by using the above-mentioned ball mill at such a blend ratio that cubic boron nitride was 90 volume %. Thereafter, the mixed powders were kept at 1000° C. in the vacuum furnace for 20 minutes and were degassed.

Furthermore, the degassed mixed powders were charged into the capsule made of Mo. Thereafter, the mixed powders were pressurized to 7.0 GPa by using the ultrahigh-pressure apparatus, and then, the temperature was raised to 1300° C. and the mixed powders were kept under this pressure-temperature condition for 10 minutes. Subsequently, by using the above apparatus, the temperature was raised to 1800° C. while keeping the pressure, and the mixed powders were kept for about 30 minutes and were sintered. Thus, a cubic boron nitride sintered body including the cubic boron nitride and a binder phase was manufactured.

<<Evaluation 1>>

The above-mentioned 14 types of sintered bodies obtained by the manufacturing method were subjected to facing processing to create smooth surfaces for observation, and the structure of the cubic boron nitride was observed by means of a scanning electron microscope (hereinafter referred to as "SEM"). The observation of the structure by means of the SEM was carried out with a field of view of 10000× magnification where a particle size of 10 nm can be identified. FIG. 1(b) shows a result of observation of Sample 1.

Based on the obtained SEM image, the following was obtained by image processing and shown in Table 1: an isolated binder phase having an area of 0.05 μm² or more and 0.5 μm² or less has a protrusion of two or more steps with respect to the cubic boron nitride, and assuming that in a first-step protrusion from a tip of the protrusion, A1 represents a side length which is perpendicular in a tip direction, and B1 represents a side length which is parallel in the tip direction; and in a second-step protrusion, A2 represents a side length which is perpendicular in the tip direction, and B2 represents a side length which is parallel in the tip direction, an area ratio of an isolated binder phase having a protrusion in which A1/B1 is one time or more and ten times or less of A2/B2, to the whole of the binder phase having the area of 0.05 μm² or more and 0.5 μm² or less was measured. In addition, an area ratio of an isolated binder phase having an area exceeding 0.5 μm², to the whole of the binder phase in the cross section of the sintered body was also obtained and shown in Table 1. In addition, an area ratio of cBN particles having a particle size of 1.5 μm or more and 10 μm or less, to the whole of the cBN was also obtained by image processing, and shown in Table 1 in the unit of volume %, assuming that the cBN particles were also distributed in the depth direction at a similar ratio.

In the image processing, binarization was performed in accordance with the color density. In advance, by element analysis, the black color was defined as cBN, the gray color was defined as a compound of Al and Co, and the white color was defined as a compound of W, and based on this, a content of the cBN as well as a region and a shape of the binder phase were determined.

The sintered body has variations in structure, and the performance thereof depends on the features of the average structure. Therefore, the number of fields of view should be increased and an asymptotic value should be used in the above-mentioned image processing. This time, five SEM images of 10000× magnification obtained by taking a picture of an arbitrary area of 9 μm long and 12 μm wide were measured and the measurement values were averaged.

When the protrusion is not formed by a combination of rectangles, calculation is performed based on an average value of two sides of each shape. For example, assuming that in a first-step protrusion from a tip, A1$a$ represents one side length which is perpendicular in a tip direction, and A1$b$ represents the other side length, an average value thereof ((A1$a$+A1$b$)/2) is defined as A1. Similarly, assuming that B1$a$ represents one side length which is parallel in the tip direction, and B1$b$ represents the other side length, an average value thereof ((B1$a$+B1$b$)/2) is defined as B1.

Subsequently, using the above-mentioned sintered body, a cutting tool was fabricated. Specifically, the cutting tool was fabricated by brazing the sintered body manufactured by the above-mentioned manufacturing method to a base material made of cemented carbide, and molding the brazed product to have a predetermined shape (ISO model number: CNGA120408). Using this cutting tool, continuous cutting of a sintered alloy was performed under the following conditions, and evaluation of wear resistance was made.

<Cutting Test Conditions>
workpiece: 0.8C-2.0Cu—remaining Fe
 (JPMA symbol: SMF4040)
 hardness HRB78 round rod of ϕ100
cutting conditions: cutting speed Vc=200 m/min.
 feed rate f=0.2 mm/rev.
 cutting amount ap=0.3 mm
 wet cutting
determination of life: Based on observation from a flank face, a state in which a cutting edge ridgeline has worn out by 200 μm or more as compared with the cutting edge ridgeline before cutting was defined as the end of life, and a time to the end of life was measured and shown in Table 1.

As for Samples 1 to 8 in which the area ratio of the isolated binder phase having the area of 0.05 μm² or more and 0.5 μm² or less and having the protrusion in which A1/B1 is one time or more and ten times or less of A2/B2, to the whole of the binder phase having the area of 0.05 μm² or more and 0.5 μm² or less, is 25% or more, high wear resistance and long life were achieved.

As for Sample 9, the area ratio of the above-mentioned binder phase region was high, while the cBN content was low, and thus, wear resistance decreased, which is considered to be the cause of short life. As for Sample 10, the area ratio of the above-mentioned binder phase region was smaller than 25%, and thus, dropping of the binder phase occurred, which is considered to be the cause of short life. As for Samples 11, 12 and 13, the above-mentioned binder phase region did not exist, which led to particularly short life. As for Sample 14, the area ratio of the above-mentioned binder phase region was large, i.e., 40%, while the cBN had fine particles, and thus, toughness was insufficient, which is considered to be the cause of short life.

<<Evaluation 2>>

Subsequently, using a cutting tool similar to that used in Evaluation 1, intermittent cutting of the sintered alloy was performed under the following conditions, and evaluation of chipping resistance was made.

<Cutting Test Conditions>
workpiece: 0.8C-2.0Cu—remaining Fe
 (JPMA symbol: SMF4040)
 hardening hardness HRA69 hardened gear of ϕ100
cutting conditions: cutting speed Vc=120 m/min.
 feed rate f=0.1 mm/rev.
 cutting amount ap=0.25 mm
 dry cutting
determination of life: Based on observation from a flank face, a state in which a cutting edge ridgeline has worn out by 200 μm or more as compared with the cutting edge ridgeline before cutting, or a state in which cutting could not be continued because of rapid chipping of the cutting edge was defined as the end of life, and a time to the end of life was measured and shown in Table 1.

In intermittent cutting, it is estimated that life is affected by the ratio of the large-area binder phase that serves as a starting point of dropping, in addition to the ratio of the above-mentioned binder phase region.

TABLE 1

| sample No. | cBN content (volume %) | cBN particle size (μm) | binder composition | sintering pressure (GPa) | sintering temperature (° C.) | binder phase in which A1/B1 is one time or more and ten times or less of A2/B2 (%) | cBN particle of 1.5 μm or more and 10 μm or less (volume %) | binder phase having an area exceeding 0.5 μm² (%) | evaluation 1 tool life (min) | evaluation 2 tool life (min) | evaluation 3 tool life (hr) |
|---|---|---|---|---|---|---|---|---|---|---|---|
| 1 | 90 | 0.5~3.0 | W Co Al Zr | 7.0 | 1800 | 55 | 60 | 10 | 45 | 25 | 32 |
| 2 | 90 | 0.5~3.0 | W Co Al Ni | 7.0 | 1800 | 45 | 60 | 10 | 43 | 22 | 31 |
| 3 | 90 | 0.5~3.0 | W Co Al Cr | 7.0 | 1800 | 35 | 60 | 10 | 39 | 20 | 31 |
| 4 | 90 | 0.5~3.0 | W Co Al Mo | 7.0 | 1800 | 25 | 60 | 10 | 35 | 21 | 30 |
| 5 | 98 | 0.5~3.0 | W Co Al Zr | 7.0 | 1800 | 50 | 60 | 5 | 38 | 24 | 33 |
| 6 | 95 | 0.5~3.0 | W Co Al Zr | 7.0 | 1800 | 53 | 60 | 8 | 43 | 25 | 33 |
| 7 | 85 | 0.5~3.0 | W Co Al Zr | 7.0 | 1800 | 46 | 60 | 25 | 40 | 15 | 27 |
| 8 | 82 | 0.5~3.0 | W Co Al Zr | 7.0 | 1800 | 40 | 60 | 30 | 37 | 12 | 24 |
| 9* | 78 | 0.5~3.0 | W Co Al Zr | 7.0 | 1800 | 40 | 60 | 50 | 28 | 7 | 19 |
| 10* | 90 | 0.5~3.0 | W Co Al | 7.0 | 1800 | 20 | 60 | 10 | 29 | 15 | 30 |
| 11* | 90 | 0.5~3.0 | TiN | 7.0 | 1800 | 0 | 60 | 10 | 18 | 10 | 16 |
| 12* | 90 | 0.5~3.0 | Al$_2$O$_3$ | 7.0 | 1800 | 0 | 60 | 10 | 15 | 8 | 15 |
| 13* | 90 | 0.5~3.0 | W Co Al Zr | 5.5 | 1650 | 0 | 60 | 15 | 24 | 11 | 27 |
| 14 | 90 | 0.1~1.0 | W Co Al Zr | 7.0 | 1800 | 40 | 0 | 5 | 25 | 28 | 20 |

*fabricated as comparative examples

Comparing Samples 1 to 4 having the same cBN content, long life was achieved in descending order of area ratio of the above-mentioned binder phase region. Comparing Samples 1 and 5 to 9 having different cBN contents, long life was achieved in Samples 1, 5 and 6 each having a cBN content of 90 volume % or more, whereas chipping occurred and life was shortened in the other samples each having a cBN content of 85 volume % or less.

As for Sample 10, the cBN content was high, i.e., 90 volume %, while the area ratio of the above-mentioned binder phase region was smaller than 25%, and thus, dropping of the binder phase occurred, which is considered to be the cause of short life. As for Samples 11, 12 and 13 as well, the cBN content was high, i.e., 90 volume %, while the above-mentioned binder phase region did not exist, which led to particularly short life. As for Sample 14, the area ratio of the above-mentioned binder phase region was large, i.e., 40%, and the cBN had fine particles, and thus, strength was high, which is considered to be the cause of long life.

<<Evaluation 3>>

Subsequently, using a cutting tool similar to those used in Evaluations 1 and 2, milling of cast iron was performed under the following conditions, and evaluation of wear resistance was made.

<Cutting Test Conditions>
workpiece: FC250
cutting conditions: cutting speed Vc=1700 m/min.
    feed rate f=0.15 mm/rev.
    cutting amount ap=0.5 mm
    dry cutting determination of life: Based on observation from a flank face, a state in which a cutting edge ridgeline has worn out by 200 μm or more as compared with the cutting edge ridgeline before cutting was defined as the end of life, and a time to the end of life was measured and shown in Table 1.

In milling of the cast iron, in addition to the ratio of the above-mentioned binder phase region, thermal wear becomes dominant, and thus, the samples including a large amount of cBN having a high heat conductivity tend to achieve long life.

Comparing Samples 1 to 4 having the same cBN content, long life was achieved in descending order of ratio of the above-mentioned binder phase region. Comparing Samples 1 and 5 to 9 having different cBN contents, long life was achieved in Samples 1, 5 and 6 each having a cBN content of 90 volume % or more, whereas chipping occurred with a heat crack as a starting point and life was shortened in the other samples each having a cBN content of 85 volume % or less. As for Sample 10, the cBN content was high, i.e., 90 volume %, and thus, long life was achieved.

As for Samples 11 and 12, the cBN content was high, i.e., 90 volume %, while ceramics having low heat conductivity was used in the binder phase, which led to short life. As for Sample 13, the cBN content was high, i.e., 90 volume %, and cemented carbide having high heat conductivity was used in the binder phase, which led to relatively long life. As for Sample 14, the cBN had fine particles, and thus, toughness was low, a heat crack developed and chipping occurred, which is considered to be the cause of short life.

Although the embodiment and the example of the present invention have been described above, it should be understood that the embodiment and the example disclosed herein are illustrative and not limitative in any respect. The scope of the present invention is defined by not only the description above but also the terms of the claims, and is intended to include any modifications within the scope and meaning equivalent to the terms of the claims.

The invention claimed is:

1. A cubic boron nitride sintered body comprising cubic boron nitride and a binder phase, wherein
    a content of the cubic boron nitride is 82 volume % or more and 98 volume % or less,
    in a cross section of the cubic boron nitride sintered body, an isolated binder phase having an area of 0.05 $\mu m^2$ or more and 0.5 $\mu m^2$ or less has a protrusion of two or more steps with respect to the cubic boron nitride, and
    assuming that in a first-step protrusion from a tip of the protrusion, A1 represents a side length which is perpendicular in a tip direction, and B1 represents a side length which is parallel in the tip direction; and in a second-step protrusion from the tip, A2 represents a side length which is perpendicular in the tip direction, and B2 represents a side length which is parallel in the tip direction, an area ratio of an isolated binder phase having a protrusion in which A1/B1 is one time or more and ten times or less of A2/B2, to the whole of the isolated binder phase having the area of 0.05 $\mu m^2$ or more and 0.5 $\mu m^2$ or less, is 25% or more.

2. The cubic boron nitride sintered body according to claim 1, wherein
    said binder phase includes W, Co, Al, and any one or more of a simple substance, a mutual solid solution, carbide, nitride, carbonitride, boride, and oxide of at least one element selected from the group consisting of Zr, Ni, Cr, and Mo.

3. The cubic boron nitride sintered body according to claim 1, wherein
    particles of said cubic boron nitride having a particle size of 1.5 μm or more and 10 μm or less after sintering constitute 50 volume % or more of the whole of the cubic boron nitride.

4. The cubic boron nitride sintered body according to claim 1, wherein
    said area ratio of the isolated binder phase having the protrusion in which A1/B1 is one time or more and ten times or less of A2/B2, to the whole of the binder phase having the area of 0.05 $\mu m^2$ or more and 0.5 $\mu m^2$ or less, is 40% or more.

5. The cubic boron nitride sintered body according to claim 1, wherein
    in said cross section of the cubic boron nitride sintered body, an area ratio of an isolated binder phase having an area exceeding 0.5 $\mu m^2$, to the whole of the binder phase, is 20% or less.

6. The cubic boron nitride sintered body according to claim 1, wherein
    said content of the cubic boron nitride is 86 volume % or more and 95 volume % or less.

7. A cubic boron nitride sintered body tool, having the cubic boron nitride sintered body as recited in claim 1, at least at a portion that forms a cutting edge.

* * * * *